_United States Patent Office_

2,850,512
Patented Sept. 2, 1958

2,850,512

TITANIUM ESTER COMPLEXES

Harry H. Beacham, Plainfield, N. J., and Kenneth M. Merz, Niagara on the Lake, Ontario, Canada, assignors to National Lead Company, New York, N. Y., a corporation of New Jersey No Drawing. Application April 23, 1957
Serial No. 654,436

11 Claims. (Cl. 260—429.5)

This invention relates to complex esters of titanium. More specifically, this invention relates to compositions of matter comprising organotitanium esters and 1,2-diamines. This application is a continuation-in-part of our co-pending application S. N. 394,489, filed November 25, 1953, now abandoned.

Organic esters of titanium such as the alkyl titanates, aryl titanates and the like, have recently evoked considerable interest in various chemical arts, because of their ready reactivity with a large variety of chemical substances to produce stable titanium-containing compositions or to improve the properties of various materials that may be treated with them. They are useful, for example, as paint vehicles, textile treating agents, modifiers for oleoresinous varnishes and in various similar ways.

Difficulty has occasionally been experienced, however, in employing these organotitanium esters because their reactivity is too great for some applications. When used in oleoresinous varnishes, for example, the addition of titanates improves the hardness and quality of the film produced, but in the case of varnishes containing certain highly-reactive resins, the reaction between the resin and the titanate ester tends to take place prematurely causing gelation and poor storage stability. In various other applications as well, it is desirable to modify or mitigate the reactivity of the organotitanium esters for some applications, as will be readily understood by those skilled in this art.

An object of this invention, therefore, is to produce improved titanium ester compositions. A further object is to produce titanium ester compositions of decreased reactivity. A still further object is to provide such compositions which are characterized by decreased reactivity, but otherwise preserve the characteristic chemical properties of the unmodified organotitanium esters. Additional objects and advantages will be apparent from the following more complete description and claims.

In its broader aspects the present invention contemplates a composition of matter comprising the reaction product of a monomeric organotitanium ester and a 1,2-diamine. This invention also contemplates the method of modifying the reactivity of organotitanium esters which comprises adding thereto a 1,2-diamine. In a particularly desirable embodiment this invention contemplates a composition comprising a monomeric organotitanium ester and a 1,2-diamine having the formula:

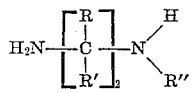

wherein R and R' may be hydrogen or alkyl radicals containing up to 2 carbon atoms, and R" may be hydrogen, alkyl radicals containing up to 2 carbon atoms, or amine- or hydroxyl-substituted alkyl radicals containing up to 6 carbon atoms. Examples of such 1,2-diamines are ethylene diamine, propylene diamine and β-aminoethylethanolamine. The structure of these complexes contains a 5-membered ring formed by coordination of 2 amino groups with a titanium atom, resulting in a ring structure such as for example,

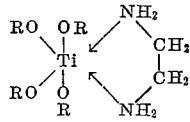

Organotitanium esters to which the present invention applies may be, for example, monomeric alkyl orthotitanates, preferably those containing up to about 8 carbon atoms per alkyl group, such as isopropyl, n-butyl, secondary butyl, 2-ethylbutyl, isobutyl, and 2-ethylhexyl titanates; monomeric cycloalkyl orthotitanates containing up to about 6 carbon atoms per cycloalkyl group, such as cyclohexyl and cyclopentyl titanates; monomeric aryl orthotitanates containing up to about 7 carbon atoms per aryl group, such as phenyl and tolyl titanates.

The method of practicing the invention is simple and consists ordinarily in mixing the monomeric organotitanium ester with the 1,2-diamine. The complexing action may take place at room temperature although some heat is evolved. No special precautions are required other than the ordinary ones required for the preservation of the starting materials. The reactants should be anhydrous since the uncomplexed organotitanium esters are in general quite susceptible to hydrolysis by water, and most of the complexed esters, while less readily decomposed, are also unstable in the presence of excessive quantities of water. The condensed titanium esters formed by this reaction with water have been found to be less compatible with most vehicle systems and less effective in obtaining improved hardness and quality of resultant films than the monomeric 1,2-diamine titanium esters.

The ratio of organotitanium ester to the 1,2-diamine may be varied widely and will depend to some extent upon the nature of the particular ester and diamine employed. However it is preferred in general to have from 2 to 8 amino groups of the diamine for each atom of titanium in the organotitanium ester. Smaller amounts of the diamine may be employed with diminished stabilizing effect since not all of the titanium ester will be reacted to form the complex, while larger quantities do not in most cases provide sufficient additional stabilization to justify their use.

As noted above, the stabilizing effect of the diamine on the organotitanium esters is believed to depend upon the formation of a 5-membered ring structure in which 2 of the amino groups are coordinately bonded to the titanium, the titanium atom thus increasing its coordination number from 4 to 6. This increase in the coordination number of the titanium atom results in reduced activity of the titanium and hence stabilizes the complex. This complex ring is apparently even more stable in the presence of the excess diamine. This type of structure therefore is useful in preventing or modifying the reaction between organotitanium esters and water, reactive resins, polyhydroxy organic compounds, etc. The beneficial effect of the 5-membered ring structure in the compositions of the instant invention is shown by the fact that simple monoamines such as n-butylamine, diethylamine and the like form only unstable compositions which are no better than the simple monomeric esters themselves.

The following examples are presented to illustrate the preparation and use of the novel compositions of this invention.

*Example 1*

A resin solution was prepared from equal parts of Epon 1007, which is a commercial epoxy resin of considerable chemical reactivity, diacetone alcohol, and ethylene glycol monoethyl ether. (The epoxy resins are condensation products of bisphenols and epichlorohydrin, marketed under the "Epon" trademark by the Shell Chemical Co., and Epon 1007 is a resin of this type having an epoxide equivalent of 1600–1900).

A curing agent for this resin solution was prepared by mixing 340 parts of tetrabutyl titanate with 60 parts of ethylene diamine and dissolving the resulting solid complex in 2400 parts of isobutanol. Fifty parts of the resin solution and 12 parts of the curing agent solution were mixed while heating slightly to dissolve the complex. Moderate agitation was supplied during the mixing period to prevent premature gelation caused by local excesses of curing agent. The resulting solution was drawn down on a steel panel at about 3 mil film thickness and allowed to dry several days at room temperature. The resulting film was clear, transparent and uniform. It had a Sward rocker hardness of about 47 and was sufficiently flexible to withstand 30% distention on a Bell Telephone Laboratory conical mandrel.

Another portion of the same Epon resin solution was subjected to the same treatment, but using a curing agent prepared as above but omitting the ethylene diamine. The resin gelled almost immediately to a rubbery semi-solid.

Similar results were obtained when tetra-2-ethylbutyl titanate was substituted for the tetrabutyl titanate used in this example.

Example II

Another curing agent was prepared by dissolving 14.8 parts of propylene diamine and 40.4 parts of tetraethyl-oxyethyl titanate in 500 parts of hot n-butyl Cellosolve (ethylene glycol monobutyl ether). This complex was used to cure another portion of the Epon 1007 solution described in Example I, using 50 parts of the resin solution and 24.3 parts of the curing agent solution. The resulting composition was applied to a steel panel and baked at 90° C. for 80 minutes. The resulting film was clear, flexible, hard and durable, similar to the film prepared in Example I.

Example III

A curing agent was prepared by dissolving 104 parts of β-aminoethylethanolamine in 340 parts of tetrabutyl titanate. Considerable heat was produced. The liquid reaction product was a reddish brown color. 6 parts of this curing agent were added to 50 parts of the Epon 1007 solution described in Example I, and the resulting composition was applied to a steel panel and baked for 1 hour at 100° C. The film produced was substantially identical with those previously described.

Example IV 90 parts of ethylene diamine were added to 396 parts of tetra-n-amyl titanate to produce a curing agent composition. Heat was produced, and the reaction product was a soft, white solid, soluble in diacetone alcohol, Cellosolve (ethylene glycol monoethyl ether), benzyl alcohol, chloroform and 2-methylpropanol. The solid complex was incorporated into Glyptal 2454 resin in the proportion of 5 parts of the complex to 200 parts of resin. Glyptal 2454 is a commercial alkyd resin made from linseed fatty acids, having an acid number of 3–4 and a non-volatile content of 50%, supplied by the General Electric Company.

For comparison, a sample of untitanated Glyptal was taken from the same can, and 0.1% lead and 0.02% cobalt driers were added to both the titanated and the untitanated Glyptal. Both the untitanated and the titanated Glyptal were then applied to steel panels with a 0.006 in. doctor blade and baked for 1 hour at 100° C. The film of untitanated Glyptal was wrinkled and gas-checked, while the titanated Glyptal was smooth, clear and flexible. Attempts to introduce an equivalent amount of uncompleted amyl titanate into this alkyl resulted in immediate gelation.

Tetracyclohexyl titanate was used with equal success in place of tetra-n-amyl titanate.

Example V

A complex titanate was prepared by reacting 206 parts (2 mols) of diethylene triamine with 420 parts (1 mol) of tetraphenyl titanate. The reaction product was a red-orange liquid.

This was incorporated into a standard phenolic varnish prepared according to the following formulation:

| | Parts by weight |
|---|---|
| Linseed oil | 250 |
| BR-254 | 100 |
| Xylol | 350 |
| Lead drier | 2.5 |
| Cobalt drier | 0.5 |
| Phenyl titanate-diethylene triamine complex | 35 |

The resulting varnish was applied with a 6 mil film applicator of a cold-roller steel panel, and then dried for 45 minutes at 100° C. The dried film was smooth, transparent, continuous and impervious and possessed uniform texture and high gloss. The Sward rocker hardness of the film was 35, and it withstood 30% distention on a Bell Telephone Laboratory conical mandrel without breaking.

For comparison, a similar varnish was prepared, omitting the phenyl-titanate-diethylene triamine complex, applied to a steel panel and dried in the manner just described. The dried film was badly wrinkled and gas-checked.

For additional comparison, two more varnishes were prepared according to the above formulation, but omitting the diethylene triamine-phenyl titanate complex and substituting therefor in one case 11 parts of diethylene triamine and in the other case 24 parts of phenyl titanate, these quantities being substantially identical with the quantities of each substance previously introduced in the form of the complex. The film containing the diethylene triamine alone failed to dry to a hard finish while that containing the phenyl titanate alone was very hard but less flexible than the one containing the complex. Similar results were obtained using tetratolyl titanate in place of tetraphenyl titanate.

Example VI

A complex titanate was prepared by reacting 103 parts (1 mol) of diethylene triamine with 340 parts (1 mol) of tetrabutyl titanate. The product was a yellow liquid. This complex was incorporated into an ethyl cellulose coating composition according to the following formulation:

| | Parts by weight |
|---|---|
| Medium viscosity ethyl cellulose | 15 |
| Xylol | 20 |
| Butanol | 65 |
| Diethylene triamine-butyl titanate complex | 15 |

The ethyl cellulose was first dissolved in the xylol-butanol solvent, then the diethylene triaminebutyl titanate complex was added. The resulting clear, homogeneous blend was brushed onto steel panels and allowed to air-dry 30 minutes. It was then heated in an oven at 100° C. for 15 minutes. The final film has a Sward rocker hardness of 56 and withstood 20 percent distention on the Bell Telephone conical mandrel. It was clear, almost colorless and was unaffected by water or dilute alkali and only slightly softened by organic solvents.

While this invention has been described and illustrated by the examples shown, it is not intended to be strictly limited thereto, and other variations and modifications may be employed within the scope of the following claims.

We claim:

1. A coordinately bonded monomeric complex organotitanium composition comprising a monomeric titanium ester selected from the group consisting of alkyl orthotitanates containing up to 8 carbon atoms per alkyl group, cycloalkyl titanates containing up to 6 carbon atoms per cycloalkyl group, aryl titanates containing up to about 7 carbon atoms per aryl group and a 1,2-diamine having the formula

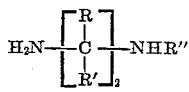

$$H_2N-\left[\begin{array}{c}R\\|\\C\\|\\R'\end{array}\right]_2-NHR''$$

where R and R' are selected from the group consisting of hydrogen and alkyl radicals containing up to 2 carbon atoms, R'' is selected from the group consisting of hydrogen, alkyl radicals containing up to 2 carbon atoms, and amine substituted and hydroxyl substituted alkyl radicals containing up to 6 carbon atoms.

2. Composition according to claim 1 wherein said diamine is ethylene diamine.

3. Composition according to claim 1 wherein said diamine is propylene diamine.

4. Composition according to claim 1 wherein said diamine is β-aminoethylethanolamine.

5. Composition according to claim 1 wherein said titanium ester is an alkyl titanate containing up to about 8 carbon atoms in the alkyl group.

6. Composition according to claim 1 wherein said titanium ester is a phenyl titanate.

7. Composition according to claim 1 wherein said diamine is present in amount to provide from about 2 to about 8 amine groups for each atom of titanium in the organotitanium ester.

8. Composition according to claim 1 wherein said titanium ester is tetrabutyl titanate and said diamine is ethylene diamine.

9. Composition according to claim 1 where said titanium ester is tetraethoxyethyl titanate and said diamine is propylene diamine.

10. Composition according to claim 1 where said titanium ester is tetra-n-amyl titanate and said diamine is ethylene diamine.

11. Composition according to claim 1 where said titanium ester is tetraphenyl titanate and said diamine is diethylene triamine.

References Cited in the file of this patent

UNITED STATES PATENTS

| | | |
|---|---|---|
| 2,278,965 | Peski et al. | Apr. 7, 1942 |
| 2,620,318 | Boyd et al. | Dec. 2, 1952 |
| 2,643,984 | Boyd | Jan. 30, 1953 |
| 2,686,798 | Gmitter | Aug. 17, 1954 |
| 2,689,858 | Boyd | Sept. 21, 1954 |